(12) United States Patent
Schwarze

(10) Patent No.: US 11,225,383 B2
(45) Date of Patent: Jan. 18, 2022

(54) SCRAPER SYSTEM FOR BELT CONVEYORS AND METHOD FOR CLEANING BELT CONVEYORS

(71) Applicant: Cornelia Kill-Frech, Herne (DE)

(72) Inventor: Hans-Otto Schwarze, Herne (DE)

( * ) Notice: Subject to any disclaimer, the term of this patent is extended or adjusted under 35 U.S.C. 154(b) by 163 days.

(21) Appl. No.: 16/476,654

(22) PCT Filed: Jan. 6, 2018

(86) PCT No.: PCT/DE2018/100006
§ 371 (c)(1),
(2) Date: Jul. 9, 2019

(87) PCT Pub. No.: WO2018/127260
PCT Pub. Date: Jul. 12, 2018

(65) Prior Publication Data
US 2021/0130105 A1  May 6, 2021

(30) Foreign Application Priority Data

Jan. 9, 2017  (DE) .................. 10 2017 000 078.6
Jul. 4, 2017  (DE) .................. 10 2017 114 931.7

(51) Int. Cl.
*B65G 45/16*  (2006.01)
*B65G 45/10*  (2006.01)

(52) U.S. Cl.
CPC .................................. *B65G 45/16* (2013.01)

(58) Field of Classification Search
None
See application file for complete search history.

(56) References Cited

U.S. PATENT DOCUMENTS

| | | | |
|---|---|---|---|
| 5,016,746 A * | 5/1991 | Gibbs | B65G 45/12 15/256.51 |
| 5,301,797 A * | 4/1994 | Hollyfield, Jr. | B65G 45/16 198/499 |

(Continued)

FOREIGN PATENT DOCUMENTS

| CN | 2 461 896 Y | 11/2001 |
|---|---|---|
| CN | 2461896 Y | 11/2001 |

(Continued)

OTHER PUBLICATIONS

International Search Report in International Patent Application No. PCT/DE2018/100006, dated Jun. 13, 2018, with English translation (6 pages).

(Continued)

*Primary Examiner* — Kavel Singh
(74) *Attorney, Agent, or Firm* — Nixon Peabody LLP

(57) ABSTRACT

A stripper system for belt conveyors. The system includes an adjustable, spring-mounted system support running transversely to the direction of travel of the belt conveyor, on which stripper blocks made from an elastomer are interchangeably secured next to one another. The system support is suspended on both sides of a tripper pulley by a support mounting so that the support system can rotate about a support axis of rotation, which impresses, by a spring device, a predefinable torque directed counter to the rotational direction of the tripper pulley. Such axis allows the system support to rotate such that it together with its stripper blocks can swing away. The spring device has an adjusting spring, a damper spring coupled thereto, and a spring bolt. Both springs are connected to the support mounting, and the spring bolt includes a section that initially actuates the damper spring when it is determined that the adjusting spring has travelled a prescribed distance.

19 Claims, 15 Drawing Sheets

(56) References Cited

U.S. PATENT DOCUMENTS

| | | | |
|---|---|---|---|
| 6,498,609 B1 * | 12/2002 | De Haan | H04N 9/646 345/589 |
| 6,843,363 B2 * | 1/2005 | Schwarze | B65G 45/16 198/497 |
| 6,991,088 B1 * | 1/2006 | Smith | B65G 45/16 198/499 |
| 2012/0247922 A1 | 10/2012 | Waters | |
| 2016/0001329 A1 | 1/2016 | Schwarze | |

FOREIGN PATENT DOCUMENTS

| | | |
|---|---|---|
| CN | 1850359 A | 10/2006 |
| CN | 102826363 A | 12/2012 |
| CN | 103 562 102 A | 2/2014 |
| CN | 103787054 A | 5/2014 |
| DE | 8714352 U1 | 12/1987 |
| DE | 8914732 U1 | 2/1990 |
| DE | 3915609 A1 | 11/1990 |
| DE | 68914486 T2 | 8/1994 |
| DE | 9416219 U1 | 1/1995 |
| DE | 19859263 A1 | 7/2000 |
| DE | 19856338 B4 | 9/2004 |
| DE | 60225704 T2 | 4/2009 |
| EP | 0 396 890 A1 | 11/1990 |
| EP | 0396890 A1 | 11/1990 |
| EP | 2212224 B1 | 6/2012 |
| EP | 2941394 B1 | 7/2016 |
| KR | 1020060031729 A | 10/2006 |
| TW | 200916388 A | 4/2009 |
| TW | M424327 U | 3/2012 |
| TW | M424328 U | 3/2012 |
| TW | M470831 U | 1/2014 |
| WO | WO 03/035518 A1 | 5/2003 |
| WO | 2008/140805 A1 | 11/2008 |
| WO | WO 2010/029482 A1 | 3/2010 |
| WO | 2014106621 A1 | 7/2014 |
| WO | WO 2015/165577 A1 | 11/2015 |
| WO | WO 2017/118452 A1 | 7/2017 |

OTHER PUBLICATIONS

Written Opinion of International Searching Authority in International Patent Application No. PCT/DE2018/100006, dated Jul. 9, 2019, with English translaiton (14 pages).

International Preliminary Report on Patentability in International Patent Application No. PCT/DE2018/100006, dated Jul. 9, 2019 (10 pages).

* cited by examiner

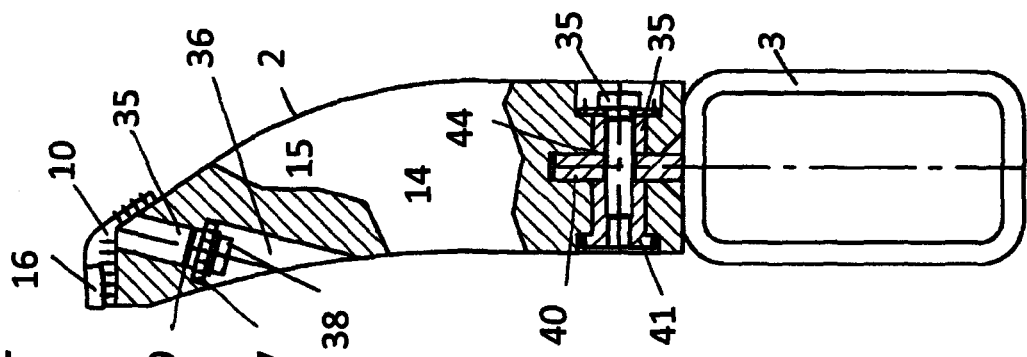
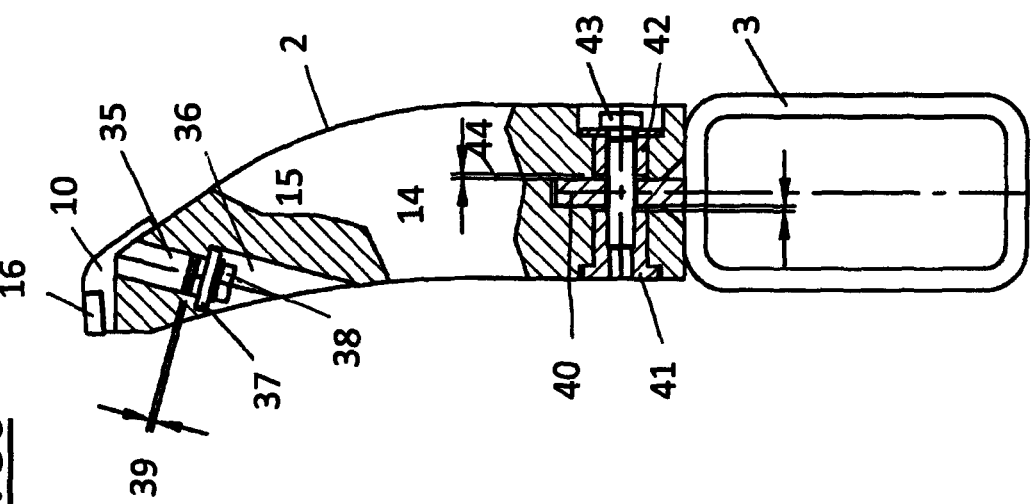

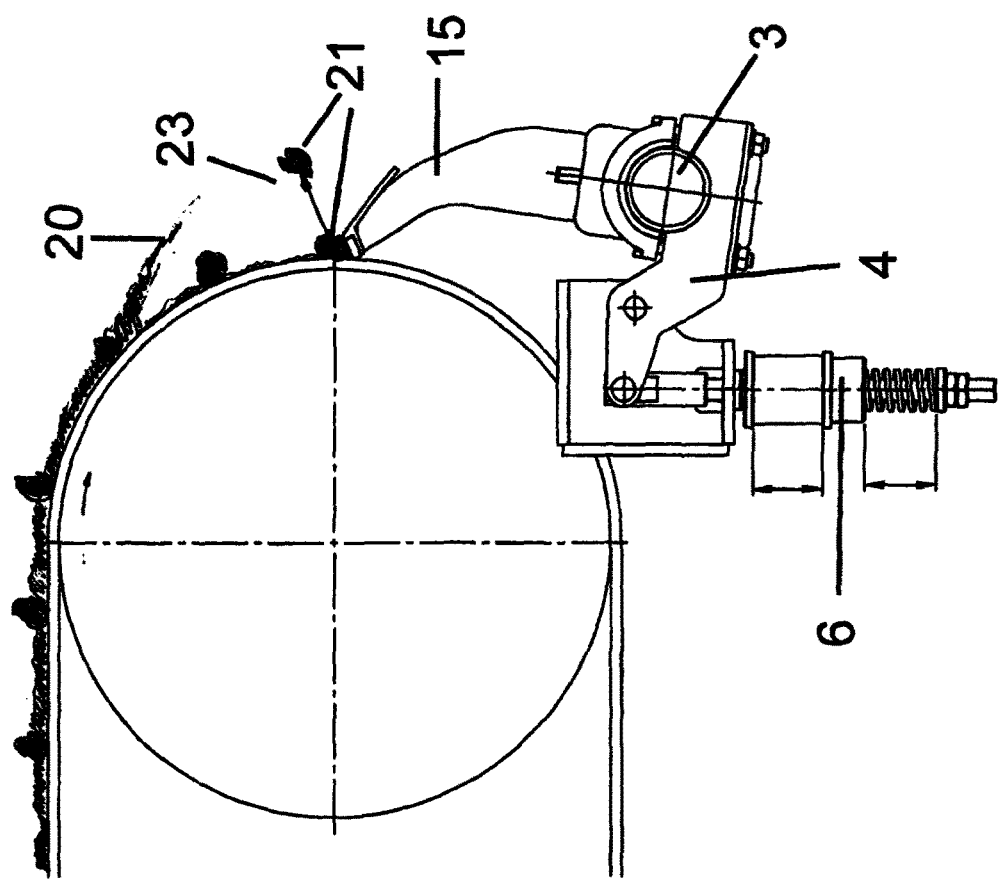
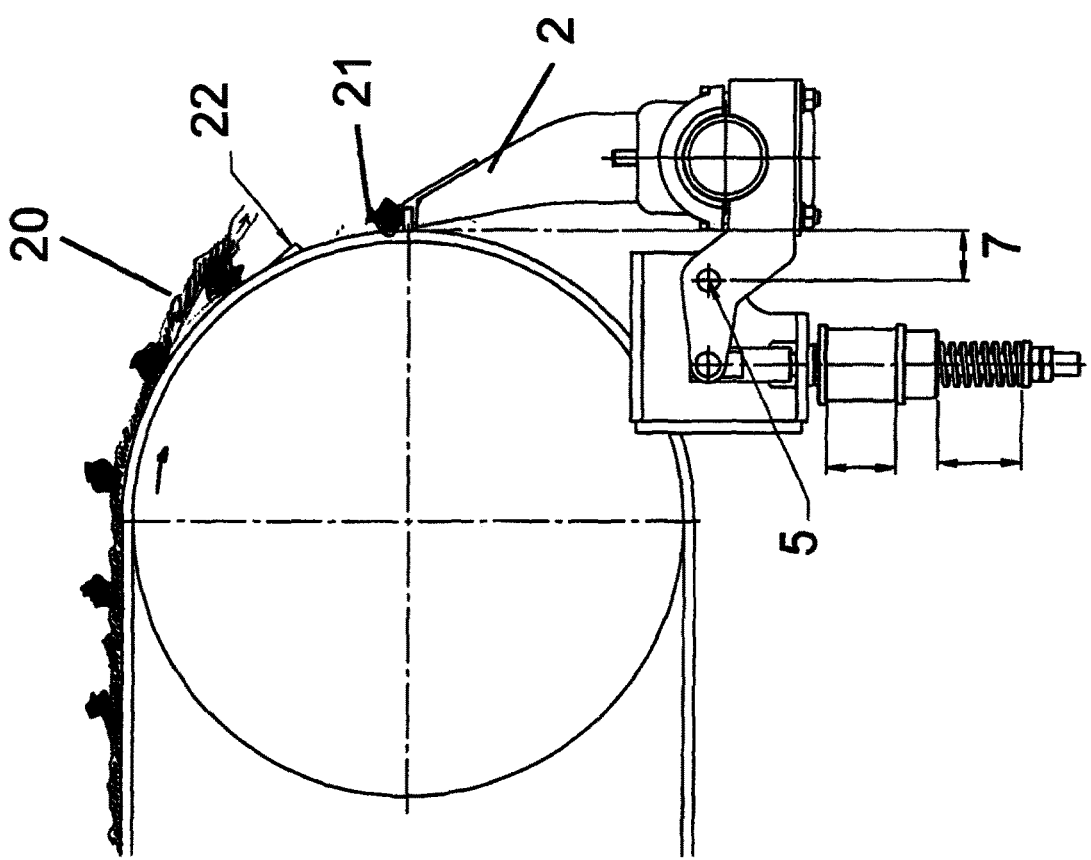

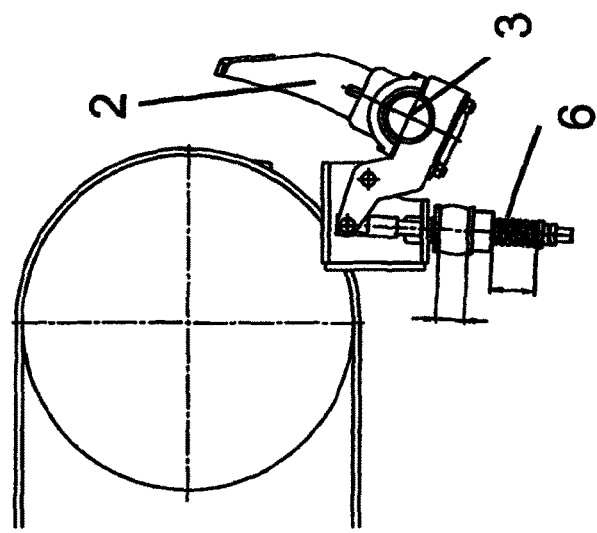
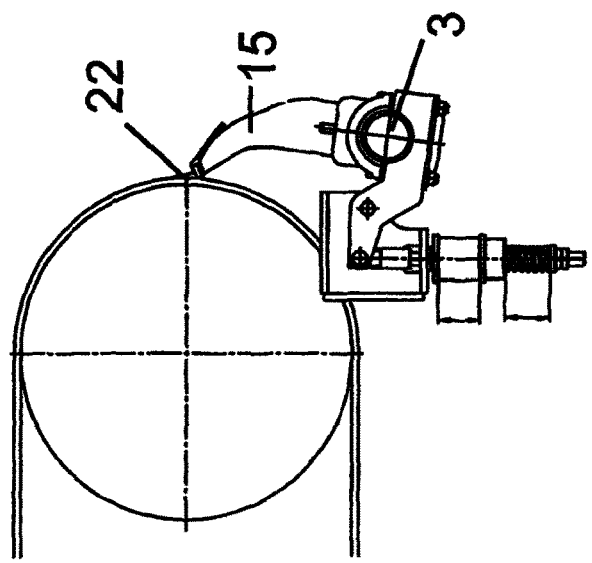
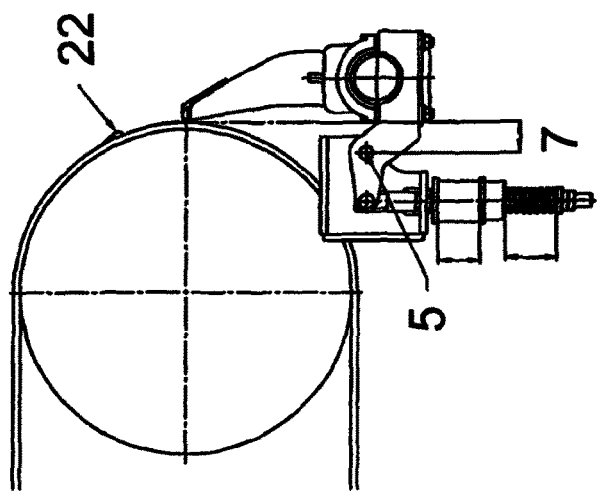

SCRAPER SYSTEM FOR BELT CONVEYORS AND METHOD FOR CLEANING BELT CONVEYORS

CROSS-REFERENCE TO RELATED APPLICATIONS

This application is a U.S. National Stage of International Application No. PCT/DE2018/100006, filed Jan. 6, 2018, which claims the benefit of Germany Patent Application No. 10 2017 000 078.6, filed Jan. 9, 2017, and of Germany Patent Application No. 10 2017 114 931.7, filed Jul. 4, 2017, all of which are incorporated herein by reference in their entireties.

The invention relates to a scraper system for belt conveyors subjected to high levels of stress, a suitable belt scraper block and a suitable pivot device, each comprising energy-absorbing means, and to a combination of primary scrapers and secondary scrapers. The invention also comprises the belt conveyor and tripper pulley as points of reference. The invention is particularly suitable for fast-moving belt conveyors. "Fast-moving" is used in the following to denote all belt conveyors that are operated at a speed of four meters per second or more.

Belt scrapers are used for a wide variety of conveyed materials and under a wide range of conveying conditions. They must also function reliably in cases where the properties of the material being conveyed change quickly, for example outdoors in rainy conditions and far away from workshops, for example in the case of raw material extraction, with a long service life being required. Downtime should be kept to an absolute minimum, since high costs are generally incurred by production losses.

In order to increase the throughput of belt conveyors, in principle, either the belts can be widened or more heavily loaded, or the belt speed can be increased. Of course, all of these measures can also be implemented simultaneously. In all of these cases, the requirements on the belt scrapers are increased, the task of which it is to keep the lower run of a circulating belt clean after the conveyed material has been discharged by the tripper pulley of the belt conveyor.

When the conveyor belt is widened, the problem is usually solved by increasing the number of belt scraper modules, also referred to as blocks or scraping fingers or scrapers, installed on a system support. As a result, the undulations in the belt conveyor resulting from this widening can be satisfactorily compensated.

It is only possible to increase loading of the belt if the conveyed material cannot slip down at the sides during conveying and the intrinsic jerking of the system. The looser the material being conveyed, the less the loading can be increased; sticky material that has a tendency to clump together is better suited in this case. However, even more significant problems arise in terms of the belt scraper systems used. It has been shown that all known systems that run at normal speed exhibit weaknesses when the belt speed and the belt loading are significantly increased.

The momentum transferred to the belt scraper modules increases linearly and the impact energy increases quadratically with the belt speed. Belt scraper modules that are arranged in the region of the tripper pulley usually operate in a pushing and cutting or paring manner. The conveyed material still stuck to the belt strikes a blade and is pushed "overhead". The transferred momentum provides additional pressing force. In the event of belt defects or severe caking, the belt scraper typically swings radially outwards on account of the momentum and then springs back softly after a certain amount of time, such that the generally sharp blade does not effect chopping onto the belt. With increasing belt speeds, this momentum causes the belt scraper to swing out further and it therefore takes a relatively long time for said belt scraper to return to its original position and continue with its scraping work. In the meantime, the corresponding track on the belt remains uncleaned. This track on the belt can become several meters long, which is unacceptable.

The distance by which the individual belt scraper module can swing out depends on whether it is rigidly mounted on the system support and therefore on whether the swinging-out of an individual module also leads to the unaffected modules on the remaining tracks of the belt swinging out at the same time.

Most additional belt scraper systems are positioned on the lower run just behind the tripper pulley and, in contrast to the pushing belt scrapers, act in a pulling manner. If the belt scrapers are pressed on more firmly, the belt may yield and waves may form, which is undesirable. The conveyed material scraped off from the lower run of the conveyor belt must change its direction and is discharged downwards through the intermediate spaces in the scraper modules. In doing so the scraper is pressed against the belt by a spring. With increasing speed and scraping performance, the system tends to become blocked, since the intermediate spaces can no longer cope with the higher volumetric flow rate.

In all of these cases, when belt defects arise or when conveyed material adheres strongly to the belt, substantial forces act on the belt scrapers due to impacts, the kinetic energy of which must be absorbed and dissipated. These impacts also affect the system support and the suspension means. But they also directly affect the blades on the line on which the blade edges make contact with the belt. These blade edges are subjected to strong abrasion, and thus to wear, on account of the friction produced.

This is often countered by using particularly hard, abrasion-resistant materials, such as hard metal or ceramics, such that the service life can be extended as much as possible. However, at the same time, hardness of these materials reduces their toughness and thus breaking strength, resulting in a conflict of objectives in the region of the blades at higher speeds: On the one hand, hard, brittle materials are needed due to their high resistance to wear, but on the other hand, tougher materials are needed for their higher breaking strength and due to the required increased absorption capacity and transferal of the higher kinetic energy.

Another conflict of objectives arises from the need to absorb the kinetic energy produced by impacts. Usually, this energy is converted into deformation energy in damping elements. The problem with damping elements of this kind is their inertia, which increases the more energy there is that needs to be dissipated. This increase in inertia is undesirable, since, with increasing belt speed, the reaction speed of the belt scrapers to impacts must increase, and not decrease, by the same extent as the belt speed.

Another conflict of objectives arises in that the higher impact energy in the event of belt defects must not lead to damage to the belt. Therefore, if higher spring forces to the belt scrapers for pressing and more massive blades are used in order to absorb the higher impact forces, the reaction forces acting on the belt would also be higher and this would risk causing serious damage to the belt. Higher pressing forces of the belt scrapers on the belt would also increase belt friction, which would result in higher operating effort and faster wear of the belt.

The object of the invention is therefore to provide a device that allows an increase in belt speed and belt loading and that solves the above-mentioned conflicts of objectives.

The invention achieves this object according to the independent claim 1 by means of a scraper system for the deflection region of belt conveyors formed of a tripper pulley and comprising a tripper pulley and a belt conveyor, said scraper system comprising at least one adjustable and spring-mounted system support transverse to the direction of travel of the belt conveyor, to which system support one or more scraper blocks made from an elastomer are interchangeably fastened next to one another, the system support being suspended so as to be rotatable about a support axis of rotation by means of a support mounting on both sides of the tripper pulley, a predefinable torque being impressed on the support axis of rotation by means of a spring device, which torque is directed against the direction of rotation of the tripper pulley, and the support axis of rotation allows a rotation of the system support about such an angle of rotation as to permit a swinging-out movement of the system support together with the scraper blocks thereof, the spring device is formed of an adjusting spring, a damper spring coupled thereto, and a spring bolt formed as a pull rod that connects both springs to the support mounting, and the spring bolt has a ledge which only actuates the damper spring if the adjusting spring has covered a predefinable spring travel.

Two equivalent embodiments of the invention relate to the spring device. In a first embodiment, it is provided that the spring device comprises a spiral spring that acts as the adjusting spring, an elastomer spring that acts as the damper spring the spring bolt is connected by the first end thereof to the support mounting and comprises an adjustment option for a stop at the second end thereof, the stop being suitable for receiving one end of the adjusting spring, an additional ledge is attached to the other end of the adjusting spring, which additional ledge connects the adjusting spring to the damper spring, a stop between the adjusting spring and the damper spring is attached to the spring bolt, which stop limits the spring travel covered by the adjusting spring and strikes the ledge when this limit has been reached, which ledge pushes against one end of the damper spring, the damper spring has a receiving portion for fixing to the bracket on the other end, a limiting ledge is attached to the spring bolt on the other side of the fixation on the support mounting, which limiting ledge limits the movement of the spring bolt towards the springs.

In a second embodiment, it is provided that the spring device has a spiral spring that acts as the adjusting spring, an elastomer spring that acts as the damper spring the spring bolt is connected by the first end thereof to the support mounting and comprises an adjustment option for a stop at the second end thereof, the stop being suitable for receiving one end of the damper spring, an additional ledge is attached to the other end of the damper spring, which additional ledge connects the adjusting spring to the damper spring, a stop between the adjusting spring and the damper spring is attached to the spring bolt, which stop limits the spring travel covered by the adjusting spring and strikes the ledge when this limit has been reached, which ledge pushes against one end of the damper spring, the adjusting spring has a receiving portion for fixing to the bracket on the other end, a limiting ledge is attached to the spring bolt on the other side of the fixation on the support mounting, which limiting ledge limits a movement of the spring bolt towards the springs.

The two embodiments only differ in terms of the sequential order of the two springs, which are both connected in series, as a result of which the two embodiments have the same effect. Moreover, it is possible to use other conventional materials or further damper elements such as hydraulic or pneumatic dampers as an alternative or in addition.

Further embodiments of the invention relate to the material of the scraper blocks and the damper spring. These should absorb as much impact energy as possible when subjected to stress. They are therefore made of an elastomer, preferably rubber or polyurethane used as the elastomer, preferably of a Shore hardness of 90 to 95; combinations thereof are also possible.

Another embodiment relates to the assembly. In this connection, in the region of the receiving portion for fixing, a preload lock that can pivot away is attached between the fixation and ledge. During assembly, the spring device together with the support mounting and system support comprising the belt scraper blocks can be preloaded by preloading the adjustment option somewhat, which may for example be designed as a thread comprising nuts, by assembling the system support and support mounting such that the belt scrapers rest loosely on the belt conveyor and then by releasing and pivoting away the pivotable distancing element. The adjusting spring then presses the scraper against the belt conveyor.

It has proven advantageous to select as low a pressing force as possible in order to keep wear to a minimum. During wear, the spring retightens the belt scraper blocks until the limit ledge prevents further retightening. The distance between the limiting ledge and the fixation therefore acts as a wear reserve.

Another embodiment relates to the position of the support axis of rotation to which the scraper blocks are fastened. In this case, the support axis of rotation is arranged on the tangent of the scraping line of the tripper pulley. It is hereby simplistically assumed that the scraping line forms a straight line that is parallel to the support axis of rotation over the length of the scraper blocks. In practice, this scraping line may also become an undulating curved line on account of the non-uniform wear of the individual scraper blocks. The scraping line also corresponds to the pressing line, provided that the scraper blocks lie directly on the scraping line.

With regard to the arrangement on the tripper pulley, the pressing line is typically arranged in the four o'clock position if it is assumed that the tripper pulley rotates in a clockwise direction. At high belt speeds, the vast majority of the discharged conveyed material is discharged at the one or two o'clock position and it is advisable that this flow of discharged conveyed material does not come into contact with belt scraper blocks when they swing out or with the system support.

With regard to the arrangement of the pivoting device, the bearings on both sides of the support axis of rotation must be flush with one another and the levers and spring devices on both sides of the tripper pulley must be identical, it nonetheless being sufficient in many cases if the lever and spring device is only present on one side. However, it is not necessary for the suspension means or fastening of the brackets to be symmetrical. Depending on the local conditions, the springs and support mounting can be installed around the support axis of rotation in any desired position, and indeed in different positions on both sides, which is particularly advantageous in the case of retrofitting of previously slow-traveling belt conveyors within the context of improving throughput in cramped assembly conditions.

Other embodiments relate to the scraper blocks. Each scraper block hereby comprises an upper side comprising a protective cap made of metal that is suitable for resting on the belt conveyor and being pressed resiliently against the belt conveyor. The shape of the upper side depends on the intended use. If predominantly paste-like dirt is to be removed also at high belt speed, belt scraper blocks that act in a paring manner can be used, as is known from the prior art.

A large number of head parts of such scraper blocks are described in the prior art, reference being made here by way of example to DE 602 25 704 T2. In this document, the head part extends up to the pressing line on the belt and acts in a paring manner, and said head part having an acute angle relative to the tangent of the pressing line. If a plane that passes through the pressing line is applied to the upper side of the pressing line, this plane lies above and not below the central axis of the tripper pulley.

However, if lumpy material that adheres to the belt is to be scraped off, huge amounts of kinetic energy sometimes have to be absorbed and dissipated when said material strikes the belt scraper blocks. Conventional scraper designs are not compatible with the requirement of a long service life in this case.

Therefore, in further embodiments it is provided that each scraper block is composed of the following four portions:
  a fastening to the system support
  a cuboid damping portion adjoining same thereabove
  a tapering, trapezoidal bending portion thereabove
  a protective cap thereabove.

These four portions can either transition one into the other or consist of individual parts that are joined together by positive and non-positive means. Typical dimensions are a width of 10 to 20 cm and a depth of 8 to 10 cm for the damping portion, a depth of 4 to 5 cm for the upper surface of the bending portion and a total height of 25 to 35 cm, measured from the system support.

The scraper blocks are made of a resilient material. It is important that the scraping fingers are not slim, as described for example in DE 198 59 263 A1, but rather they should be solid, deep blocks made of resilient material. These scraper blocks can dissipate the majority of the kinetic energy by deforming during high-energy impacts without it being necessary for the entire system support to swing out.

In this case, it can be provided that the surface of the scraper block and protective cap at the scraping point or on the scraping line is designed such that the scraping action is non-paring. This is preferably achieved in that the surface of the scraper block and protective cap at the scraping point is designed such that one plane, which is spanned by the central axis of the tripper pulley and the pressing line, intersects the other plane, which is applied to the upper side of the scraper blocks on the pressing line, at an acute angle, and the other plane extends below the central axis of the tripper pulley.

Pressing line should be interpreted as the place where each scraper block makes contact with the belt conveyor. During operation and with increasing wear, which may be different for each individual scraper block, this pressing line is not necessarily a straight line and the spanned plane is, in practice, mostly a collection of planes, the above-described relationship, however, also applying to all planes individually, provided that they do not coincide.

The difference between the paring and non-paring type of scraping corresponds to mechanical shaping processes. In the case of the paring type, the scraping edge undercuts the film of dirt and lifts it off in the manner of a milling machine. In the case of the non-paring type, the scraping edge pushes on the film of dirt in the manner of a file with a negative cutting angle and scrapes said film of dirt off through friction.

In this way, the scraper can reliably scrape off coarse dirt as well as large amounts of dirt from the belt conveyor.

Further embodiments relate to the protective cap and their fastening. The bending portion only tapers off in paring belt scraper blocks, but in the case of non-paring belt scraper blocks, the upper side has a surface that is inclined inwards at a slight angle, when looking towards the center of the rotating drum. The protective cap covers this upper surface at least in part and extends over part of the outer face of the bending portion. Said protective cap is typically fastened to said outer face of the bending portion by means of screw connections.

The positive and non-positive connection of the damping materials and the protective cap is fundamentally problematic. The deformations of the damping materials can be several centimeters, whereas a protective cap made of hard metal or stainless steel practically does not deform. In normal screw connections, gaps often develop on account of the lateral contraction during elongation and compression of the resilient damping materials, in which gaps the scraped-off material could enter, which can lead to considerable local stresses with subsequent crack formation. Moreover, the scraper blocks are constantly moving on account of the frictional excitation caused by the belt, which can be attributed to the non-paring arrangement and which results in loosening of conventional screw connections. Particular attention should therefore be paid to the connection between the protective cap and the damping materials.

In a preferred embodiment, it is therefore provided that the protective cap is angled, it being possible for the upper side to be composed of multiple parts, to be made perhaps of stainless steel and to comprise a receiving portion for a hard metal edge.

While the upper region rises slightly outward or is rounded in certain portions, an angled rear side protects the damping materials against impacting conveyed material. Sleeves are welded onto the inner face of said protective cap, typically two or three per scraper block, depending on the size and width of the block. Some of the sleeves have an inner thread on the inside. The damping materials of the scraper blocks have corresponding holes into which the sleeves can be inserted in a positive manner. These holes have a ledge on the inside onto which a retaining ring can be placed. The sleeves are then screwed tight from the inside, expansion screws preferably being used as screws and Nord-Lock rings preferably being used as the retaining rings. When the sleeves are screwed tight using defined forces, the damping material can be prestressed such that the protective cap can be reliably prevented from lifting off when bent.

The function of the individual scraper block is the following: In normal non-paring operation, the upper end of the bending portion rests against the belt. When this upper end strikes caked-on material on the belt, the protective cap imparts a powerful blow to the caked material by means of the relative movement. Since the kinetic energy increases with square of the belt speed, this blow transmits a considerable amount of deformation energy to the caked-on material at high belt speeds, which is generally sufficient to overcome the adhesion forces on the belt. The transferred momentum and the high centrifugal forces cause the detached caked material to be ejected upward and outward, or "punched clear", so to speak. The protective cap has the function of protecting the bending portion from sharp scraped-off material and of distributing the kinetic impact energy over the entire width of the scraper block. Moreover, in normal cases, its inert mass keeps deflections of the belt scraper block small.

The reaction force of the blunt impact during collision with the scraped-off material initially squashes the bending portion and at the same time pushes it against the belt slightly on account of the momentum, which increases the pressing force slightly and results in bending of the bending portion, the curvature of which extends in the same direction as the curvature of the tripper pulley. The energy absorbed by the scraper block on account of the reaction forces is then dissipated very quickly, in practice within a few milliseconds, by means of the elastic deformation of the bending portion and damping portion. During deformation, the upper end of the bending portion remains on the belt and no areas of the belt are left uncleaned.

However, because a paring effect is deliberately not produced in the upper end of the bending portion, on the conveyor belt a fine film is often left behind on the clean side of the scraper block, which film is completely removed by the secondary scraper if necessary. One effect of this film is that the upper edge of the scraper block cannot form a sharp edge, but rather forms a slightly rounded edge during ongoing operation on account of abrasion, which slightly rounded edge then cannot damage the belt surface when the system springs back quickly. In contrast to conventional belt scrapers, this dulling effect is therefore not undesirable. In contrast to the paring belt scraper block, the non-paring belt scraper block is not self-sharpening.

In the event of belt defects, i.e., places that cannot and should not be ejected or destroyed, the function of the scraper block changes. As soon as an obstacle passes the upper side of the bending portion, the entire scraper block is shifted outward and downward together with the system support and all other scraper blocks mounted on the system support. In the process, the bending portion bends significantly in the other direction compared to cases where the caked-on material can be dislodged, it being possible for the resulting curvature to reverse and go against the curvature of the belt, the bending stress of the bending portion being transmitted as torque to the suspension means on the system support. For this reason, the suspension means on the system support is designed such that a torque can be transmitted to the system support.

The transmitted torque results in a corresponding rotation of the system support about an axis of rotation. The spring is, as described above, designed to have at least two stages. In a first stage, the pressing force that presses the scraper blocks against the belt via the system support is adjusted. In the event of a belt defect, when the system support is forced to swing out by one of the scraper blocks, the spring travel causes the system support to deflect by the same distance traveled by the spring. The stop that limits the adjusting spring is positioned and dimensioned such that it defines the maximum possible opening width of the belt scraper blocks.

In this way, it is ensured that the largest possible belt defects can be safely passed, but also that the belt scrapers are not deflected so far as to leave an excessively large area of the belt uncleaned between the beginning of the deflection and the time when the scraper makes contact with the belt again. The swing-out procedure including swinging back to the original position usually lasts between 30 and 40 milliseconds. In the case of a belt speed between 6 and 8 m/s, only 0.18 to 0.32 meters of belt are left uncleaned.

Known technology is used for fastening elements to the system support. In this case, a bar comprising recesses is attached to the system support, such that a tongue and groove system with the scraper blocks is produced. A connection using inserted sleeve and screw systems is realized in a similar manner to the connection of the protective cap, the connection being secured against coming loose on account of vibrations in a correspondingly similar manner.

Dimensions and materials must be adapted to the high belt speeds. On the one hand, the scraper block should put up strong resistance during blunt impacts and should, as far as is possible, not separate from the belt surface. On the other hand, when real obstacles emerge, the scraper block should move out of the way immediately. These two requirements are mutually exclusive, and all the more so the higher the speed of the belt. On the one hand, the quadratic increase of the kinetic energy with the belt speed means that more of the belt scraper's dead weight has to counter the dissipation of momentum and energy for stability reasons, and on the other hand, the belt scraper block has to allow two entirely different reactions within the space of one millisecond and therefore may not develop excessive inertia. The scraper block must inherently decide within an instant whether the obstacle can or must be forcefully removed or not.

In contrast to the prior art, the head part is merely intended to provide protection against impacting conveyed material and to provide better distribution of the impact forces and impact energy, and is therefore designed as a form of protective cap. Furthermore, it is not necessary for large pressing forces to press the belt scraper blocks against the belt, nor are they damaging; however, no sharp blade that could damage the belt may be formed. While at low belt speeds, the paring action of the belt scraper is required, at high belt speeds, the centrifugal force produced during the deflection procedure facilitates the paring action so much that dirt can often be removed simply by means of the impact energy generated when the protective cap strikes it, i.e., by being knocked and skimmed off. In this regard, the fundamental technical effect is different from that of a paring belt scraper.

If, however, a belt defect or a bump in the belt makes a swinging-out movement necessary, the deformation of the individual belt scraper block initially causes the energy transmitted to be dissipated in that the module as a whole deforms significantly. The entire system support only swings out when these deformations become too strong.

This swinging-out movement happens in a specific manner. It occurs as a pivoting about a support axis of rotation, which is mounted in a two-part support mounting, a respective part of the support mounting being positioned on each side of the tripper pulley. Each of the two parts of the support mounting has a fixed bearing, wherein the two fixed bearings of the two parts are not necessarily arranged symmetrically to one another on both sides of the tripper pulley. Only the support axis of rotation must align.

The function during operation is the following: Initially, the torque from frictional forces and impact forces is transmitted by the scraper block to the axis of the system support and from there to the support mounting. The spring device is formed of the adjusting spring and damper spring and absorbs the torque gradually during an impact. In the process, the adjusting spring is the first to be actuated and determines the pressing force of the scraper block on the belt. Said adjusting spring allows for a particularly fast and wide swinging-out movement, which is necessary on account of the high belt speed.

In a second step, a damper spring, which is typically manufactured from an elastomer such as rubber or polyurethane, provides an additional spring action with a very strong damping effect; in this case, the swinging-out distance is severely restricted. The damping of the second step has the function of dissipating as much of the considerable kinetic energy transmitted to the spring mechanism as possible, such that the loads on the bracket, on which the support axis of rotation and the fixation of the spring device act, do not cause plastic deformation.

When the adjusting spring is compressed in the event of a swinging-out procedure, the end of the adjusting spring facing the damper spring pushes the ledge of the damper spring towards the fixation. Said ledge of the damper spring acts on the damper spring from the opposite side and squashes said damper spring against the fixation. The fixation connects the spring to the bracket. The length of the damper spring is comparatively short, which on the whole speeds up the return movement of the swing-out procedure and causes the scraper block to make contact with the belt again after a very short time.

Various scrapers having similar designs and arrangements as the scraper from the present invention are known from the prior art. For example, CN 18 50 359 A discloses a scraper 1, which can consist of a plurality of blocks and which is pressed in a sliding manner onto the belt at the tripper pulley 11 of the belt conveyor, the scraper 1 being fastened to a support 2 and the support 2 being fastened to a displacement system, and a spring 6 being mounted in a housing 9 and being adjustable by means of a thread 7 and connection rod 8 such that the scraper is pressed onto the belt. The spring 6 is evidently tensioned when the scraper is new such that the scraper 1 is pressed onto the belt. When the scraper is subjected to wear, the spring 6 is drawn downward and ensures that the scraper 1 is always pressed onto the belt. The connection to the thread 7 and connection rod 8 allows only minimal readjustment of the scraper 1. On account of the design, it is neither provided nor possible for the scraper to swing out in order to evade an obstacle on the belt.

CN 102 826 363 A also describes a scraper, having a scraper 9, which can consist of a plurality of blocks and which is pressed in a sliding manner onto the belt at the tripper pulley 11 of the belt conveyor 12, the scraper 9 being fastened to a support 8 and the support 8 being fastened to a displacement system 2, and a spring 6 being fastened to the displacement system such that the spring 6 pushes on the lever arm 11. Since the lever arm 11 is rigidly connected to the scraper 9 on the support 8, the scraper 9 is pressed onto the belt 12 by means of the shiftable 3 on account of the lever effect. The spring 6 is in this case also set when the scraper is new such that the scraper 9 is pressed onto the belt. When the scraper is subjected to wear, the spring 6 is drawn downward and ensures that the scraper 9 is always pressed onto the belt. On account of the design, in this case too, it is neither provided nor possible for the scraper to swing out in order to evade an obstacle on the belt. Overall, the design of the scraper appears to be more sensitive, since the lever arm 11, for example, can become soiled and blocked.

The utility model specification DE 89 14 732 U1 discloses another head scraper having two axes of rotation which are interconnected in the manner of a parallelogram, the two axes of rotation being arranged within the cross-sectional surface of the tripper pulley at the six to eight o'clock position. By means of a spring mechanism, the scraper is sprung back onto the belt after pivoting out. However, the spring mechanism disclosed is not capable of realigning itself upon wear of the scraping edges.

None of the devices in the prior art, however, are able to achieve the object of the invention. Long service life is achieved despite high travel speed in that the scraper resiliently swings away from obstacles on the belt conveyor. The choice of the axis of rotation is decisive for the elastic deformation of the scraper blocks, and determines the loading and the service life that can be achieved.

The scraper according to the invention is particularly well suited as the primary scraper in combination with a secondary, main or fine scraper, such as that described in EP 2 941 394 B1, EP 2 212 224 B1 and WO 2015/165577 A1, for example. The result is an optimal, economical solution, since this combination increases both the longevity of the simple scraper from the present invention and that of the main or fine scraper. A combination of this kind has already been described in U.S. Pat. No. 5,016,746 A, however, the combination presented here is not suitable for high belt speeds because only a single block instead of a plurality of primary scraper blocks is used, the system support of which single block cannot swing out, and the upper side of which rests on the belt at an acute angle.

The invention will be described in more detail in the following on the basis of the drawings.

FIG. 5c shows another scraper block.

FIG. 5f shows the scraper block mounted under tension.

FIG. 6a shows a belt scraper and how scraped-off material is removed from the belt.

FIG. 6b shows a belt scraper that is bending under load.

FIG. 7a,d each show a belt scraper shortly before encountering a belt defect.

FIG. 7b,e each show a belt scraper when encountering a belt defect.

FIG. 7c,f each show a scraper block swinging away when a belt defect passes by.

Figure 8B:
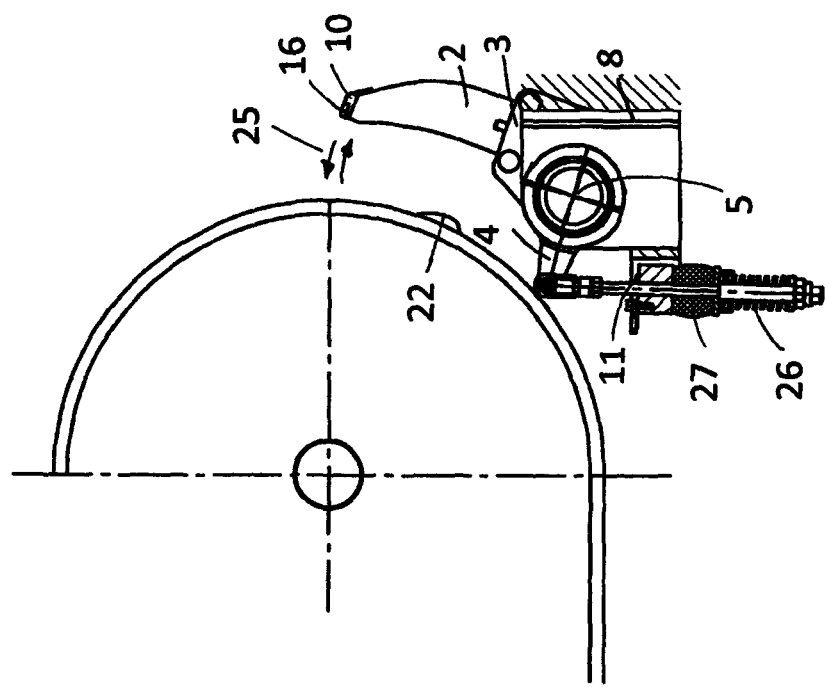
Figure 8A:
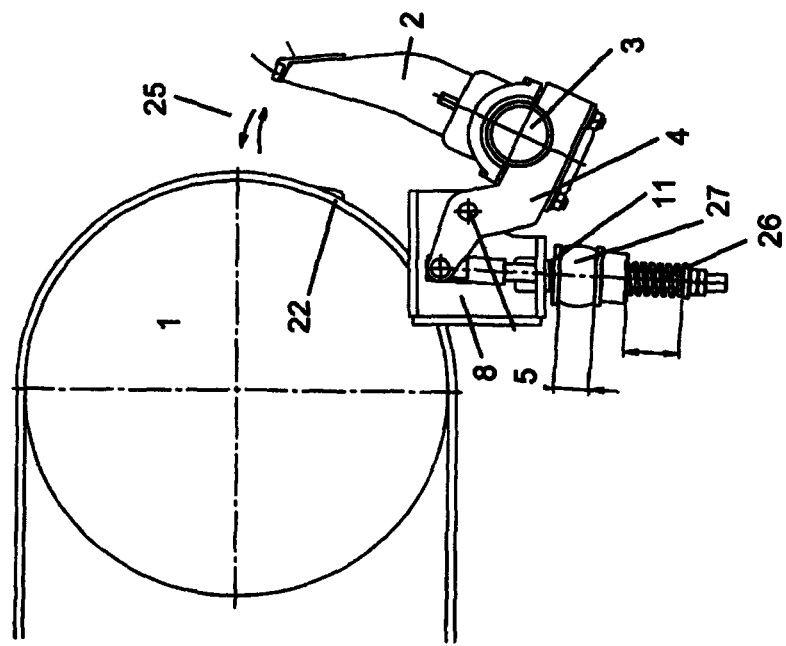

FIG. 8a,b each show the swinging movement during swinging-out and springing-back of a scraper block.

Figure 9A:
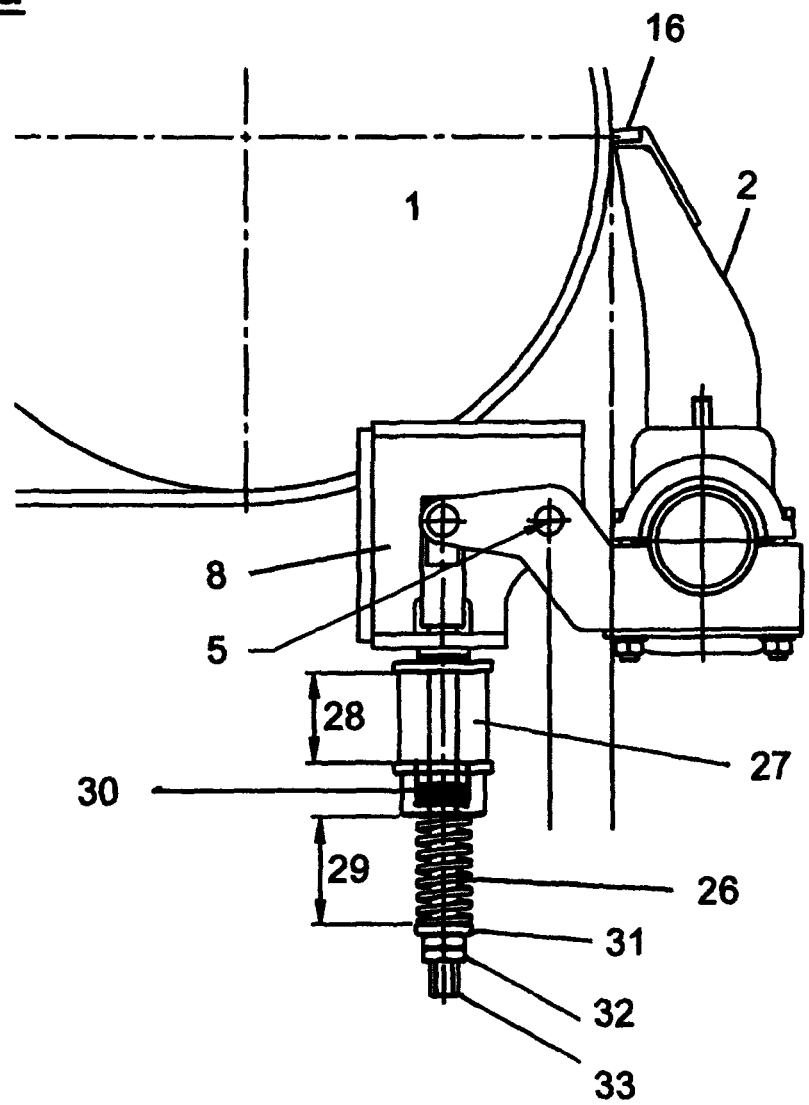

FIG. 9a shows a two-stage spring system comprising a damping system of the swing-out device.

Figure 9C:
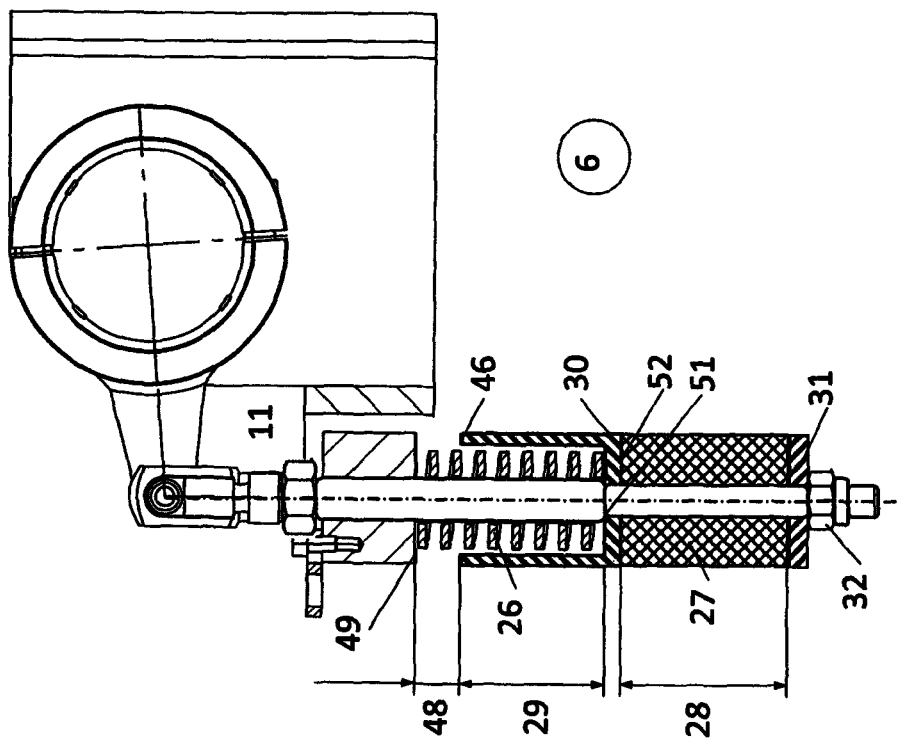
Figure 9B:
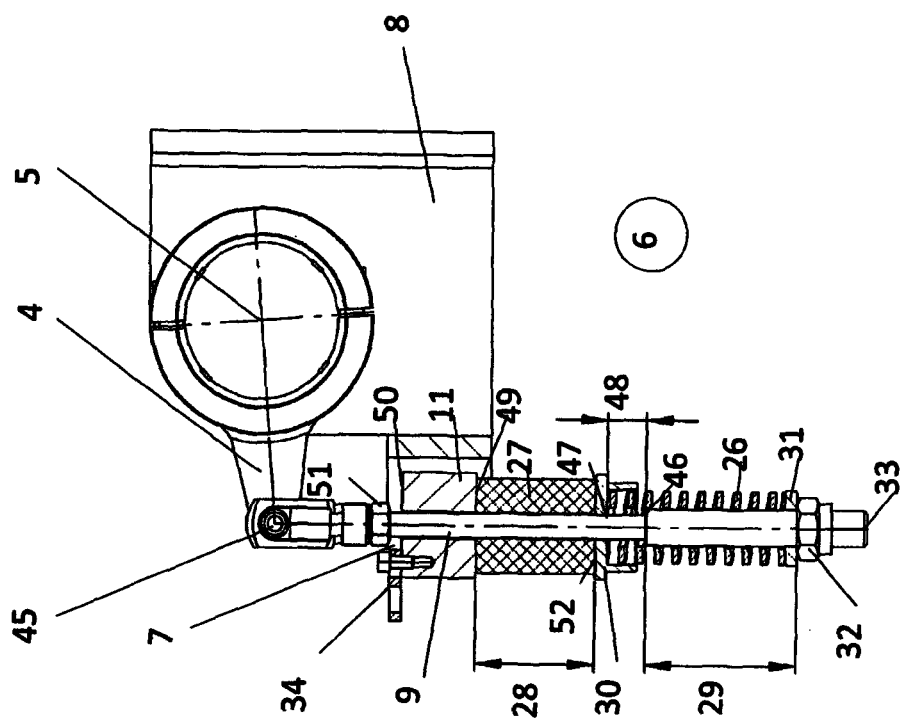

FIG. 9b shows the spring device 6 in detail.

FIG. 9c shows an alternative form of the spring device 6 in detail.

Figure 10A:
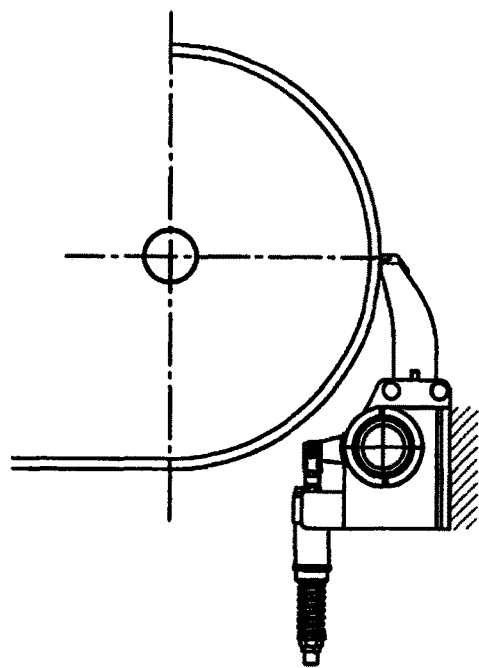
Figure 10B:
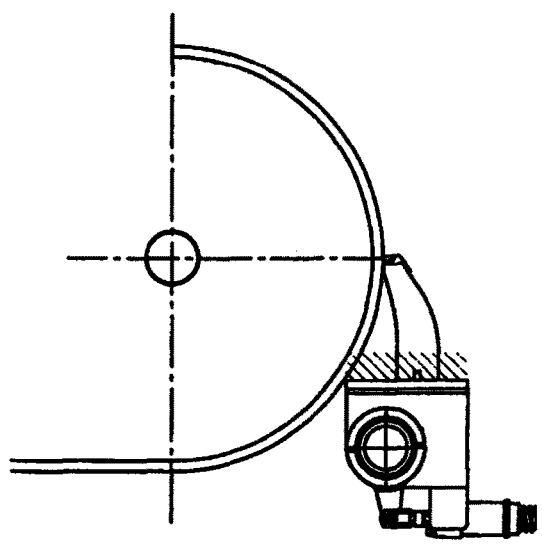
Figure 10C:
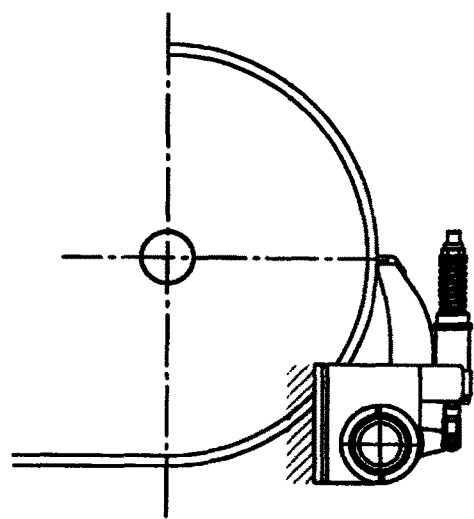
Figure 10D:
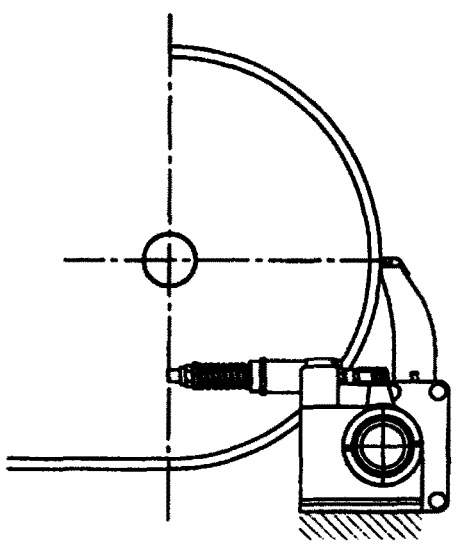

FIG. 10a,b,c,d show 4 exemplary arrangements of the scraper system.

Figure 1:
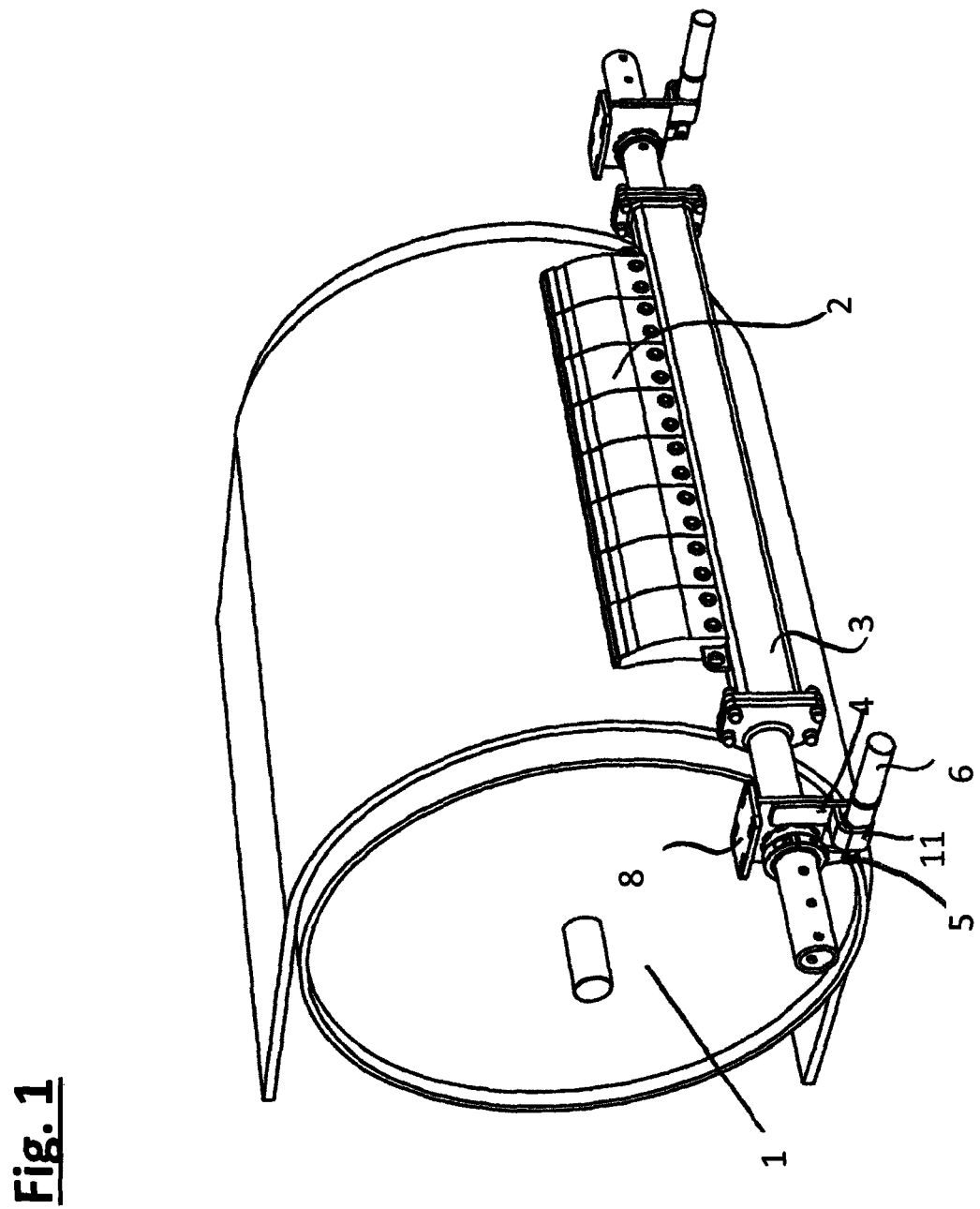
FIG. 1 shows an overview of a belt scraper according to the invention.

FIG. 1 gives an overview of a possible embodiment of the belt scraper according to the invention. A plurality of scraper blocks 2 are fastened to a support 3, and the support 3 is suspended by a support mounting 4 on both sides of the belt conveyor so as to be able to rotate about the support axis of rotation 5, the support axis of rotation 5 being mounted in a bracket 8. A spring device 6 is fastened to the bracket 8 in an articulated manner by means of the support mounting 4 and a with the support axis of rotation 5. The brackets 8 are rigidly connected to the belt frame structure and the spring device 6 is fastened to the bracket 8 in a fixation 11 in a rotatable manner. The bracket 8 and the spring device 6 may be encased in a housing such that they are protected against debris falling from the belt.

Figure 2B:
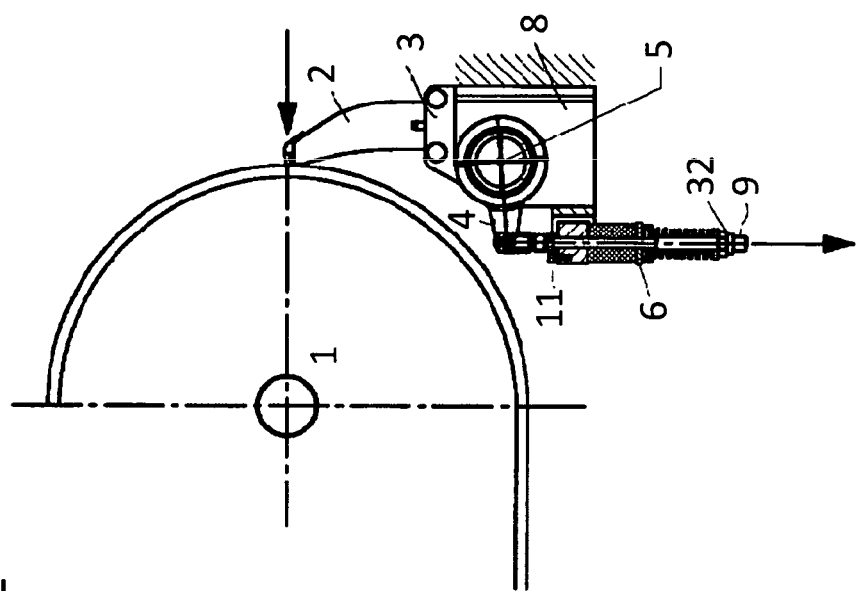
FIG. 2b shows a side view of the preloaded belt scraper.
Figure 2A:
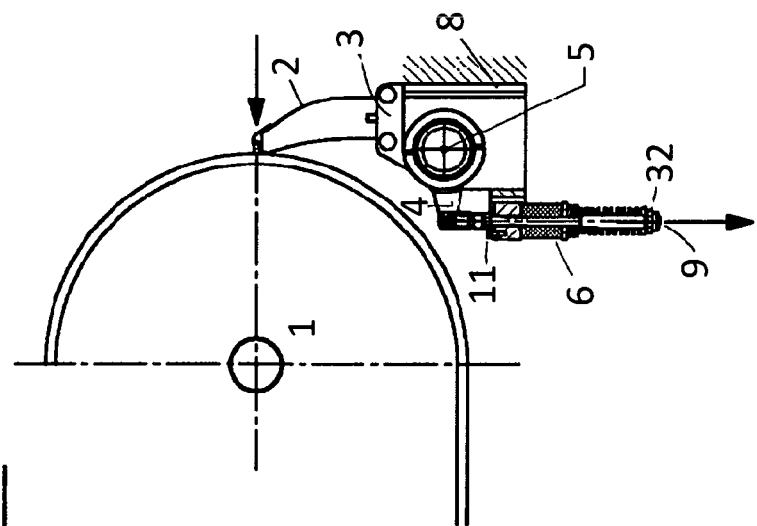
FIG. 2a shows a side view of the belt scraper resting on the belt conveyor.

FIG. 2a shows the scraper when new. When new, the point of contact of the scraper blocks 2 on the belt corresponds to the three o'clock position without preloading. The scraper blocks 2 rest loosely on the conveyor belt.

FIG. 2b shows the scraper when new and preloaded. The adjusting nuts 32 of the spring bolt 9 have been tightened somewhat here. The pressing force of the scraper blocks results from the spring force of the adjusting spring and the leverage of the support mounting 4 about the support axis of rotation 5.

Figure 2D:
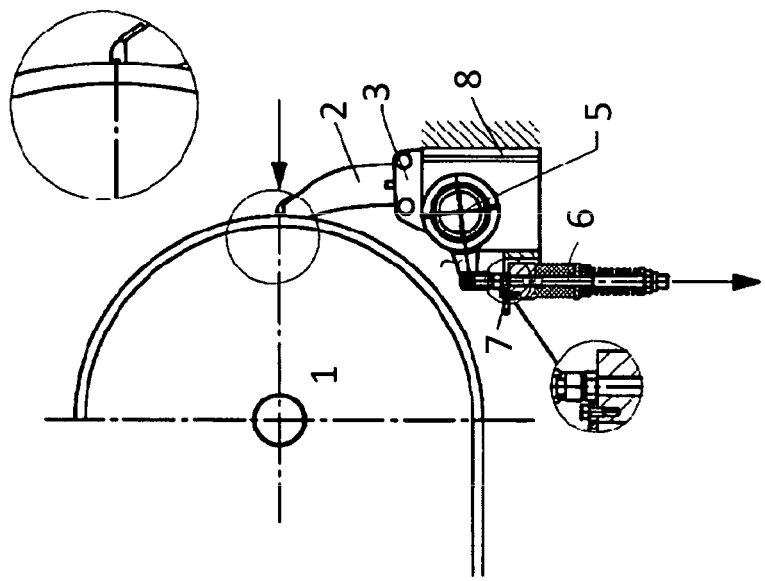
FIG. 2d shows a side view of the worn belt scraper.
Figure 2C:
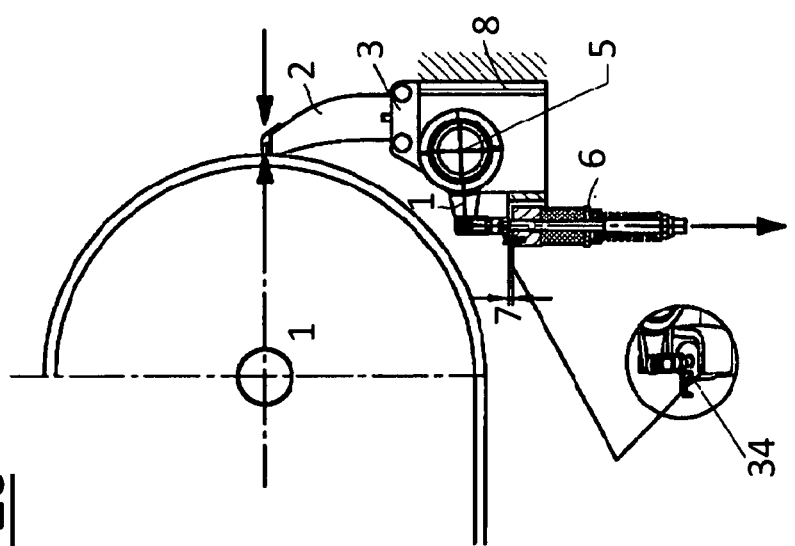
FIG. 2c shows a side view of the preload lock of the belt scraper.

FIG. 2c shows the scraper when new and preloaded and comprising the preload lock 34. The preload lock 34 is shown in greater detail here. The distance on the spring bolt 9 preserved by the preload lock corresponds to the wear reserve 7, which can be determined and correspondingly adjusted when new. Once the scraper system has been assembled and the scraper blocks rest in a tension-free manner on the belt conveyor, the preload lock 34 is released and swings out. The spring device can then build up tensile stress and transmit same to the pressing line of the belt scrapers.

FIG. 2d shows the scraper in the worn state; in this case, the wear reserve 7 has been completely used up. The scraper abuts against the belt conveyor without applying any pressure and must be replaced.

Figure 3:
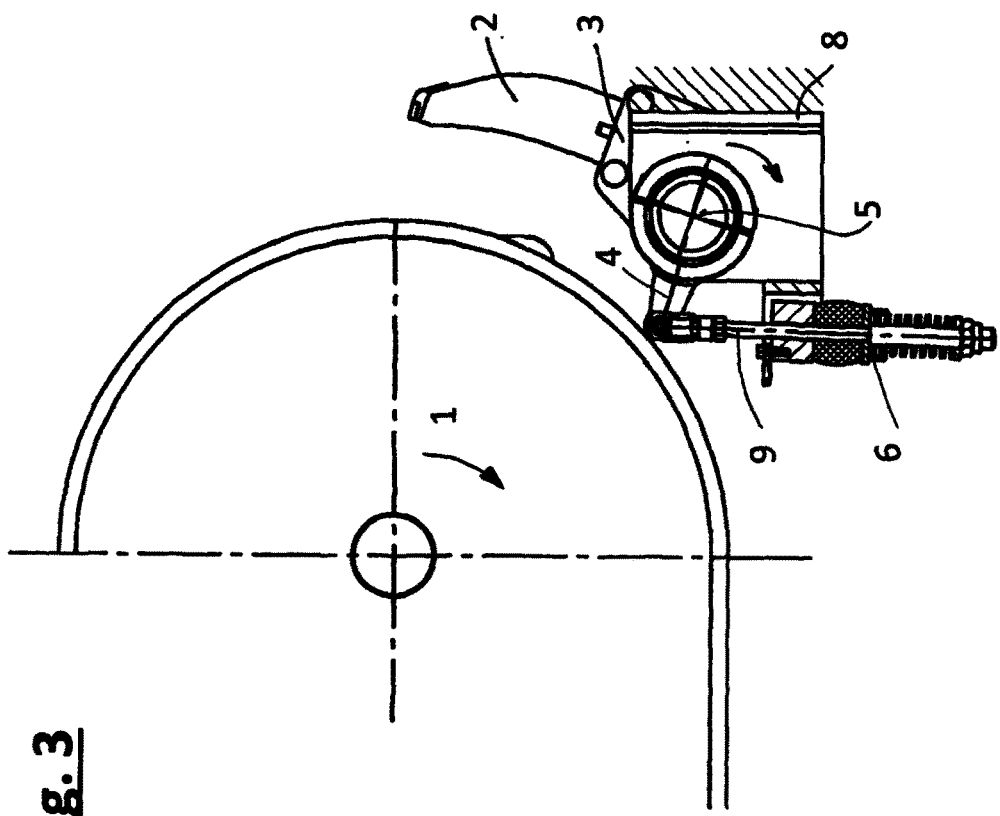
FIG. 3 shows a side view of the belt scraper when swung out.

FIG. 3 shows the scraper in the swung-out position. In the event of possible collisions with larger obstacles such as belt connectors or belt defects, the support 3 rotates together with the scraper blocks 2 thereof about the support axis of rotation 5 against the spring pressure of the spring in the direction of rotation of the tripper pulley 1, and immediately swings out in order to evade the obstacles. Subsequently, the support swings back into its original position on account of the springs relaxing once again, and the scraper blocks 2 are pressed against the belt once again in a resilient manner. In the case of small and removable obstacles, the elastic deformation of the scraper blocks causes them to evade said obstacles to a sufficient extent without the support axis of rotation having to be lifted off the belt together with the other scraper blocks.

In the case of a high belt speed, the entire swinging-out procedure takes place within tenths of a second, while the elastic deformation of the scraper blocks, which initiates the swinging-out procedure, takes place within milliseconds. Therefore, in spite of the high belt speed, the amount of belt left uncleaned on account of obstacles is very small.

Figure 4:
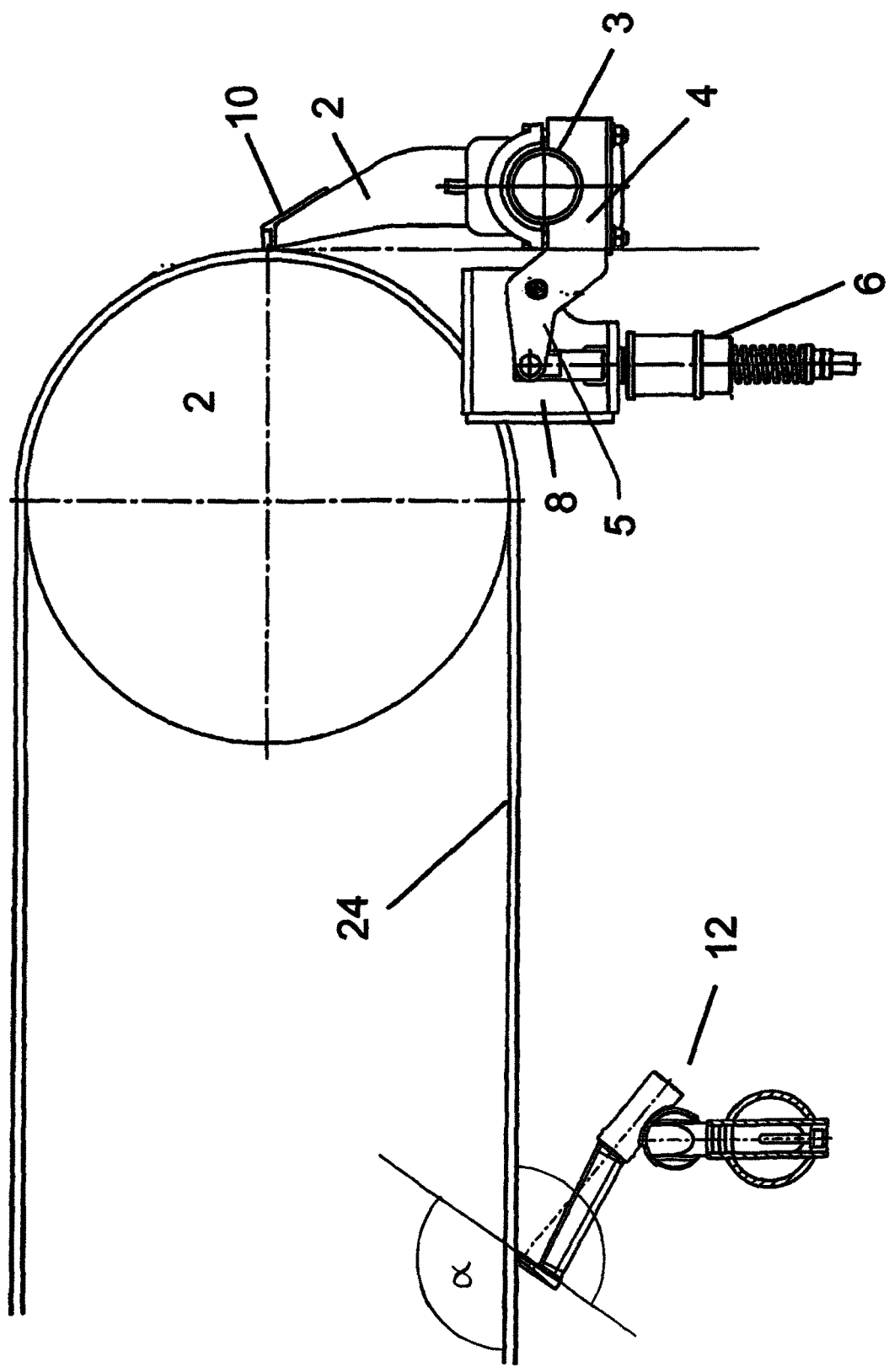
FIG. 4 shows the primary scraper and secondary scraper.

FIG. 4 shows a scraper block 2 comprising an alternative support mounting and spring system in its function as primary scraper 2 together with a typical secondary scraper 12. The two scrapers 2, 12 form a system for high belt speeds. Whereas the primary scraper 2 knocks coarse dirt from the belt 24 and thereby leaves remnants of dirt on the belt depending on the system, the secondary scraper 12 makes contact with the belt 24 in a pulling and paring manner and is responsible for fine cleaning. This pulling and paring approach of the scraper edge of the secondary scraper 12 can be identified from the obtuse angle $\alpha$ between the scraper edge and the belt.

The primary scraper in this case rests directly on the tripper pulley, which prevents the belt from swinging out in a resilient manner. For this reason, too, hardly any pressing force is required from the primary scraper on the belt, and although this pressing force is not harmful, it must merely be ensured that no gap forms between the primary scraper and the belt.

The secondary scraper then only has to pare off the residue, and the substantial loads produced by coarse conveyed material, in particular at high belt speeds, do not occur at the secondary scraper by virtue of the presence of the primary scraper. The secondary scraper can therefore be particularly lightweight, i.e., with low inert masses in the region of the blades, which not only produces an outstanding cleaning result but also significantly reduces wear. In this case, too, a low contact pressure on the belt is required, and without the secondary scraper, the belt would also require a counter-pressure roller, as its lower run would be hanging freely. In this way, the service life, often related to the kilometers traveled, can be significantly increased such that the operational life between wear-induced replacements of belt scraper modules can be kept constant or even extended in spite of the increase in belt speed.

Figure 5G:
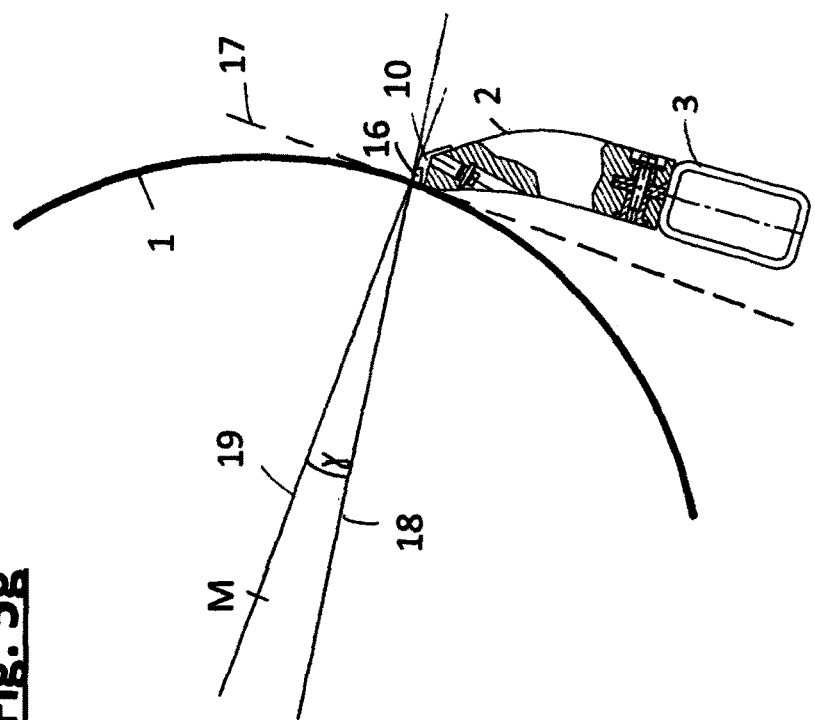
FIG. 5g shows the setting angle of a scraper block on the belt.
Figure 5A:
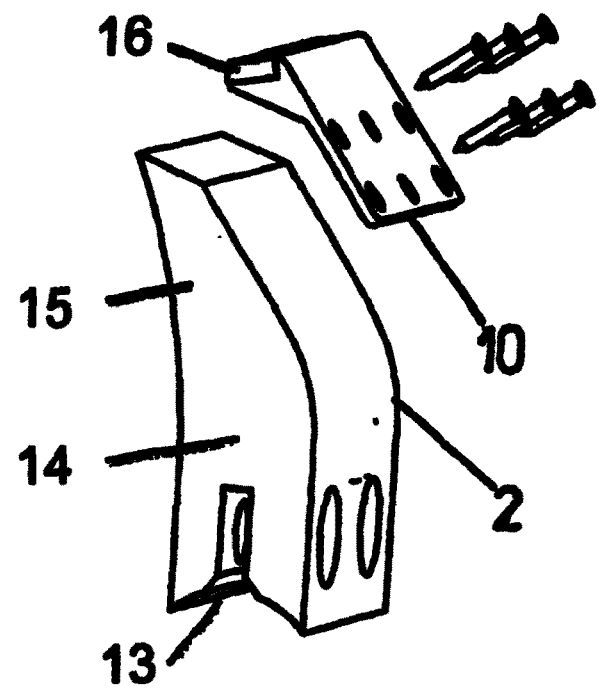
FIG. 5a shows a scraper block comprising a mounting.

FIG. 5a shows a scraper block 2 and a mounting 10, the mounting 10 being provided with holes for fastening to the scraper block 2. Ideally, the mounting 10 is made of a wear-resistant hard metal or stainless steel and is attached to the upper side of the scraper block. The four functional portions of the scraper block 2 can be seen here: The fastening portion 13 is fastened to the system support using conventional methods, such as is described in DE 198 56 338 B4. The damping portion 14 is located thereabove and has the important function at high belt speeds of dissipating the kinetic energy from the impacts with caked-on conveyed material. Said damping portion 14 compresses when loaded in a predominantly resilient manner. The bending portion 15 is located thereabove, the cross-section thereof tapering. Furthermore, the bending portion 15 can be inclined slightly towards the tripper pulley 1. Said bending portion is designed such that it can be bent inward and outward. In this way, impacts that lead to caked-on conveyed material being knocked off cause the bending portion to bend slightly by a few millimeters towards the belt; the momentum transmitted by these impacts is directed against the belt. The belt scraper block in this case does not lift off from the belt.

On the other side, the bending portion is bent outward in a resilient manner as soon as caked-on conveyed material or a belt defect causes the scraper block to swing away. The bending portion and damping portion are typically shaped and dimensioned such that the spring constant of the outward bending movements is roughly four to eight times smaller than the spring constant of the corresponding compression; ideally the spring constant for lateral deflections is five to six times smaller than for compression. This means that significantly smaller forces can result in the scraper block swinging away if a belt defect is about to pass the scraper block.

The protective cap 16 is arranged on the upper side of the scraper block 2 and can form a structural unit together with the mounting 10, however this is not necessary. The protective cap is fastened to the bending portion by means of screws or dowels without influencing the bending. The protective cap does not bend.

Figure 5B:
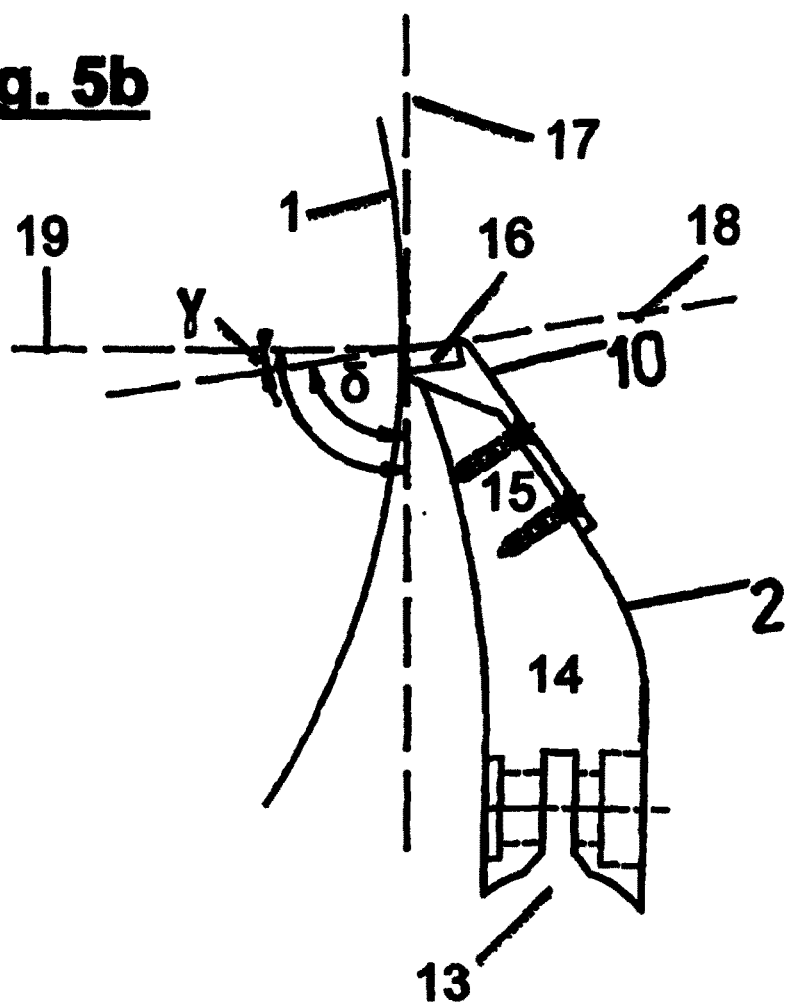
FIG. 5b shows the setting angle of a scraper block on the belt.
Figure 5E:
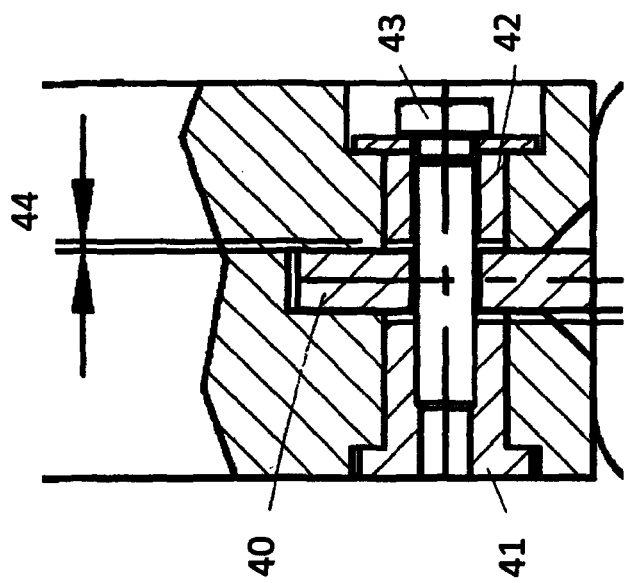
FIG. 5e shows a fastening of the scraper block on the system support.
Figure 5D:
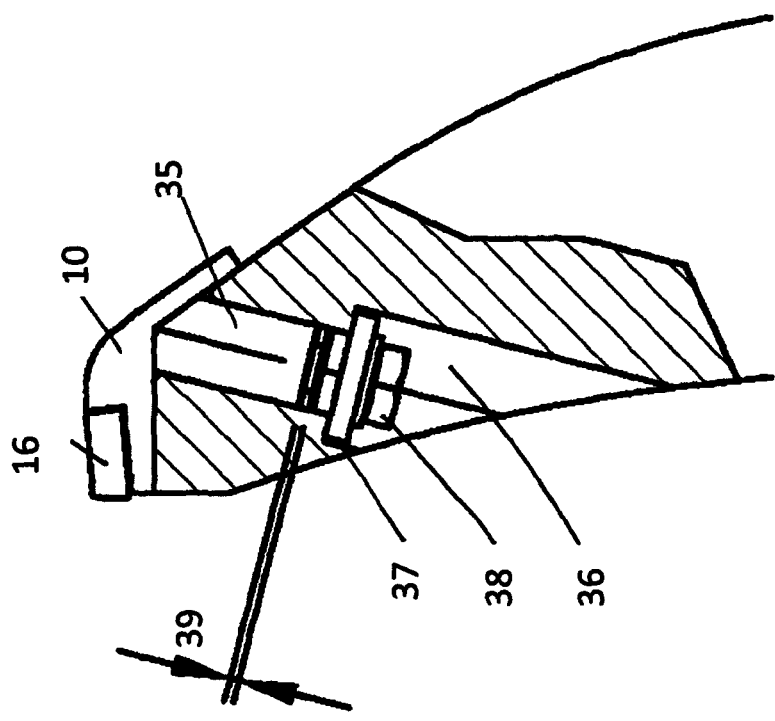
FIG. 5d shows a fastening of the protective cap on the scraper block.

FIG. 5b shows a side view of the angular arrangement of the protective cap 16 relative to the belt surface 1. Here, the tangent 17 can be seen at the point where the scraper block makes contact with the tripper pulley, which tangent is inclined at an angle δ relative to the plane 18 of the upper side of the protective cap 16 or at an angle γ relative to the plane 19 through the central axis of the tripper pulley. As a result, on account of the impacting scraped-off material and the slightly nodding inward bending movements as well as the fine, slightly abrasive residual film, the scraping edge of the protective cap 16 is always rounded, meaning that no sharp edge can form; however, these effects merely tend to appear. A chopping action and the damage associated therewith is therefore reliably prevented during spring-back. The angle δ is such that impacting scraped-off material does not push the scraper away. Normally, the angle equals 75 to 89 degrees.

FIG. 5c to 5g show an alternative scraper block 2 comprising improved fastening means. FIG. 5c is an overview of the angled stainless-steel cover 10, the pressing edge of which is provided with a hard-metal blade 16. Sleeves 35 are welded onto the inside of the stainless-steel cover and are inserted into holes 36 bored into the damping material. The sleeves 35 comprise a thread on the inside, the holes 36 comprise a ledge onto which lock washers 37 can be inserted. Preferably, lock washers 37 that secure the system against loosening are used here, e.g., Nord-Lock washers. Screws 38, preferably expansion screws, are screwed into the sleeves 35. A defined gap 39 is provided between the sleeves 35 and the lock washers 37 that is adapted to the elasticity properties of the damping material. When the screws 38 are tightened, both the screw 38 and the surrounding damping material are placed under tension and the gap 39 closes. In this way, the protective cap is prevented from lifting off due to the bending of the scraper block and the constant vibrations and the connection can also be prevented from loosening and being released, which could lead to destruction of the scraper system. The fastening of the protective cap is shown in an enlarged view in FIG. 5d.

FIG. 5c also shows the fastening of the scraper blocks 2 to the system support 3. This fastening system consists of a tongue and groove 40. The system support 3 in this case has three holes into which sleeves 41 comprising a ledge are inserted and which are tightened by means of screws 43. The screws 43, which can also be designed as expansion screws, are tightened by means of lock washers 42, for example Nord-Lock washers, a gap 44 being closed in the process, which results in desired preloading. As in the case of the protective cap 10, this prevents the connection from loosening and being released, which could lead to destruction of the scraper system. The fastening to the system support is shown in an enlarged view in FIG. 5e.

FIG. 5f shows the scraper block 2 in the tensioned state, when the gaps 39 and 44 are closed.

FIG. 5q shows the scraper block 2, which is making contact with the belt conveyor G in the four o'clock position. A plane 18 that lies on the cover cap extends below the central axis M of the tripper pulley 1 and forms an acute angle γ together with a plane that is formed by the central axis M. This acute angle γ is usually between 1 and 15 degrees, ideally approximately 5 degrees.

FIGS. 6a and 6b show how the scraped-off material 20 is removed from the scraper block 2. In FIG. 6a, caked-on material 21 approaches the protective cap 16, whereas the belt defect 22 has not yet reached the scraper block 2. In FIG. 6b, the caked-on material 21 strikes the protective cap 16, causing the bending portion 15 to bend inward. The caked-on material 21 is dislodged in the process and flung away in the direction of the arrow 23.

FIGS. 7a, 7b and 7c, on the other hand, show how the scraper block 2 evades a belt defect 22. All bumps or objects rigidly connected to the belt that cannot be scraped off are to be understood as belt defects. First, the bending portion 15 bends inward as in the case of the caked-on material. As soon as the belt defect 22 reaches the protective cap 16, the bending preload causes the entire scraper block 2 to pivot away quickly together with the support 3 and thus also the remaining scraper blocks 2 about the support axis of rotation 5 by means of the support mounting 4. This pivoting movement is exaggerated in FIG. 7c; in reality, this pivoting only occurs to the extent necessary for evading the belt defect 22. In the case of larger belt defects, the bending direction of the bending portion 15 reverses, and the belt scraper block 2 is bent outward. Since the bending force does not cause compression when the belt defect 22 passes by, but rather causes lateral bending, the effect of the springs changes and a torque is created. This torque acts on the support 3 and the support mounting 4.

Figure 7F:
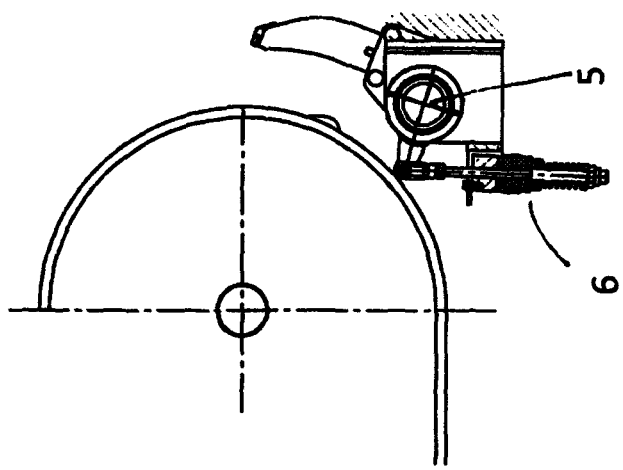
Figure 7E:
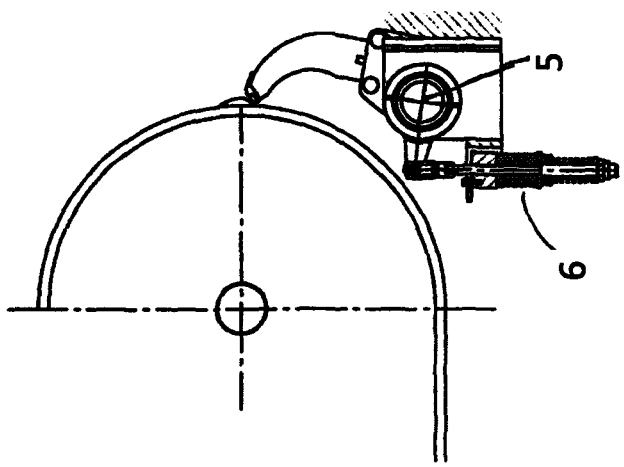
Figure 7D:
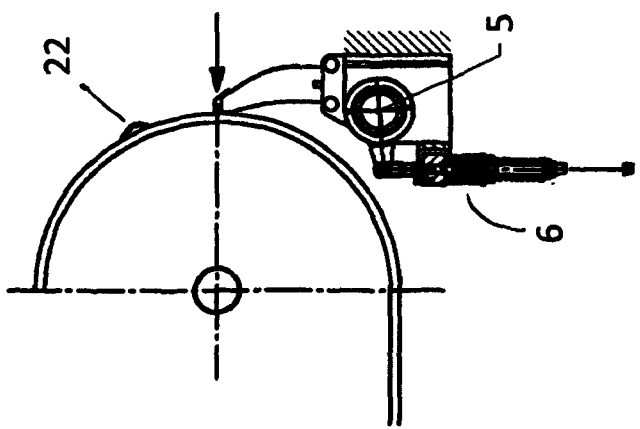

FIGS. 7d, 7e, and 7f show the same swinging-out behavior with an alternative, improved belt scraper and an alternative support mounting.

FIG. 8a shows how the support 3 and the support mounting 4 behave on account of the impressed torque. First, the torque is transmitted by means of the scraper block 2 to the axis of the support 3 and from there to the support mounting 4, which is rotated about the support axis of rotation 5 as a result. The spring device 6 is formed of the adjusting spring 26 and the damper spring 27 and absorbs the torque gradually. In the process, the adjusting spring 26 is the first to be actuated and determines the contact pressure of the scraper block 2 on the belt. Said adjusting spring 26 allows for a particularly fast and wide swinging-out movement, which is necessary on account of the high belt speed. In a second step, a damper spring 27, which is typically manufactured from rubber or polyurethane, provides an additional spring action with a very strong damping effect; in this case, the swinging-out distance is severely restricted. The damping has the function of dissipating as much of the considerable kinetic energy transmitted by the belt defect 22 to the spring mechanism as possible, such that the loads on the bracket 8, on which the support axis of rotation 5 and the fixation 11 of the spring device 6 act, cause neither plastic deformation nor excessively long swinging-out movements. After the curved scraper block 2 swings out, it is returned to the belt in stretched form, which is shown by the swing-out and swing-in direction 25.

FIG. 8b shows the same swinging-out behavior with an alternative, improved belt scraper and an alternative support mounting.

FIG. 9a shows the other embodiment of the spring device 6 in more detail. Here, the adjusting spring 26, which is designed as a spiral spring made of spring steel, is preset to a slight contact pressure by means of adjusting nuts 32 on a coupling element 33, which is designed as a threaded rod, via a ledge 31 of the adjusting screw 26. When the adjusting spring 26 is compressed in the event of a swinging-out movement, the upper end of the adjusting spring 26 pushes the ledge 30 of the damper spring upward. Said ledge 30 of the damper spring acts on the damper spring from below and squashes said damper spring against the fixation 11. The fixation 11 connects the spring to the bracket 8. The travel of the damper spring 27 is comparatively short, which on the whole speeds up the return movement of the swing-out procedure and causes the scraper block to make contact with the belt again after a very short time.

FIG. 9b shows the other embodiment of the spring device 6 in more detail. Here, tensile forces are applied to the spring bolt 9 by means of the support mounting 4 and coupling device 45. At the base of the spring bolt 9, this tensile force is transmitted from a coupling element 33, which is designed as a sleeve over the spring bolt 9, through an adjusting nut 32 and a ledge 31 of the adjusting spring 26 to the adjusting spring 26. There is a ledge 46 at the end of the sleeve which reduces the diameter to that of the pull rod 9. The adjusting spring 26 abuts the surface of the adjusting spring guide 47, the overall spring travel 48 of the adjusting spring 26 corresponds to the distance between the ledge 46 and the adjusting spring guide 47. If the sleeve can be adjusted on the coupling element in a screwable manner, it is possible to adjust said spring travel 48, if the sleeve is fastened to the pull rod in a non-releasable manner, the spring travel 48 can be correspondingly preset by means of intermediate washers. The swing-out width of the scraper block 2 can be determined from said spring travel 48 of the adjusting spring using the ratio of the distance traveled on the support axis of rotation 5.

If this spring travel 48 has been used up, i.e., the ledge 46 strikes the adjusting spring guide 47, the ledge 30 of the damper spring 27 transmits the further impact to the damper spring 27, which compresses only slightly in the process. The damper spring 27 presses on the fixation 11, which is connected to the bracket 8. In the case of both springs, the spring travel is small relative to the relevant overall spring lengths 28 and 29.

Using a pivotable preload lock 34, which is shown in the swung-out state in FIG. 9c, a defined preload can be set during assembly by the adjusting spring 26 by means of the adjusting nut 32. This produces the adjustable wear reserve 7, which limits the maximum permissible wear of the scraper block by means of the leverage, for example to the size of the hard-metal blade 16, if one is provided.

Instead of a spring bolt 9 with attached sleeve as the coupling element 33, a pull rod made of twisted solid material may also be used, the ledge 46 and other structures, such as threads, being provided. Of course, the spring device 6 may also be provided with a cover.

Since both springs 26 and 27 are connected in series, it is also possible to swap them around in a constructive way, the respective ledges being adapted accordingly.

FIG. 9c shows such an alternative embodiment, in which the two springs 26 and 27 have swapped positions. The description of FIG. 9c applies analogously here.

FIGS. 10a to 10d show examples of how the bracket 8 and the resulting orientation of the spring device can be spatially positioned, with all intermediate positions being possible.

LIST OF REFERENCE NUMBERS

1 Tripper pulley
2 Scraper block
3 Support
4 Support mounting
5 Support axis of rotation
6 Spring device
7 Wear reserve
8 Bracket
9 Spring bolt
10 Mounting
11 Fixation
12 Secondary scraper
13 System support fastening
14 Damping portion
15 Bending portion
16 Protective cap
17 Tangent
18 Plane of upper side of protective cap
19 Plane through central axis of tripper pulley
$\alpha, \beta, \gamma$ Angles
20 Scraped-off material
21 Caked-on material
22 Belt defect
23 Arrow direction
24 Conveyor belt
25 Swing-out and swing-in direction
26 Adjusting spring
27 Damper spring
28 Spring length of damper spring
29 Spring length of adjusting spring
30 Ledge of damper spring
31 Ledge of adjusting spring
32 Adjusting nuts
33 Coupling element
34 Preload lock
35 Sleeve
36 Hole
37 Lock washer
38 Screw
39 Gap
40 Tongue and groove
41 Sleeve
42 Lock washer
43 Screw
44 Gap
45 Coupling element
46 Ledge
47 Adjusting spring guide
48 Travel of adjusting spring
49 End of damper spring
50 Other side of fixation
51 Limiting ledge
52 End of damper spring
M Central axis of tripper pulley
G Belt conveyor

The invention claimed is:

1. A scraper system for the deflection region of belt conveyors formed of a tripper pulley and comprising a tripper pulley and a belt conveyor, comprising
at least one adjustable and spring-mounted system support transverse to the direction of travel of the belt conveyor,
to which system support one or more scraper blocks made from an elastomer are interchangeably fastened next to one another,
the system support being suspended in a rotatable manner about a support axis of rotation by means of a support mounting on both sides of the tripper pulley,
a predefinable torque being impressed on the support axis of rotation by means of a spring device, the predefinable torque being directed against the direction of rotation of the tripper pulley, and
the support axis of rotation allows a rotation of the system support about such an angle of rotation as to permit a swinging-out movement of the system support together with the scraper blocks thereof,
wherein
the spring device is formed of an adjusting spring, a damper spring coupled thereto, and a spring bolt formed as a pull rod that connects both to the support mounting, the spring device including a ledge connecting the adjusting spring to the damper spring,
and the spring bolt comprises a first stop which only actuates the damper spring if the adjusting spring has covered a predefinable spring travel, wherein the first stop is arranged to limit the spring travel covered by the adjusting spring by striking the ledge and pushing against an end of the damper spring after the predefinable spring travel has been covered.

2. The scraper system according to claim 1, wherein the spring device comprises
a spiral spring that acts as the adjusting spring,
an elastomer spring that acts as the damper spring,
the spring bolt being connected by the first end thereof to the support mounting and having an adjustment option for a second stop at the second end thereof,
the second stop being suitable for receiving the one end of the adjusting spring,
said ledge being attached to the other end of the adjusting spring,
the damper spring having a receiving portion for a fixation of the bracket on the other end,
a limiting ledge being attached to the spring bolt on the other side of the fixation on the support mounting, the limiting ledge limiting the movement of the spring bolt towards the springs.

3. The scraper system according to claim 2, wherein the elastomer spring includes a rubber or a polyurethane elastomer.

4. The scraper system according to claim 2, wherein, in the region of the receiving portion for the fixation, a preload lock that can pivot away is attached between the fixation and the ledge.

5. The scraper system according to claim 1, wherein the support axis of rotation is arranged on a tangent of the scraping line of a tripper pulley.

6. The scraper system according to claim 1, wherein each scraper block has an upper side comprising a protective cap made of metal that is suitable for resting on the belt conveyor and being pressed resiliently against the belt conveyor.

7. The scraper system according to claim 1, wherein each scraper block is composed of the following four portions:
a fastening to the system support,
a cuboid damping portion adjoining said fastening and being located above said fastening
a tapering, trapezoidal bending portion located above said cuboid damping portion, and
a protective cap located above said tapering, trapezoidal bending portion.

8. The scraper system according to claim 6, wherein the surface of the scraper block and protective cap at the scraping point is designed such that the scraping action is non-paring.

9. The scraper system according to claim 8, wherein the surface of the scraper block and protective cap at the scraping point is designed such that the one plane, which is spanned by the central axis of the tripper pulley and the pressing line, intersects another plane, which is applied to the upper side of the scraper blocks on the pressing line, at an acute angle, and the other plane extends below the central axis of the tripper pulley.

10. The scraper system according to claim 8, wherein the protective cap is angled such that the upper side can be composed of multiple parts.

11. The scraper system according to claim 6, wherein sleeves comprising an inner thread are welded onto an inner face of the protective cap.

12. The scraper system according to claim 11, wherein the scraper blocks have holes for accommodation of the sleeves as well as a ledge on the inside onto which a retaining ring can be placed.

13. The scraper system according to claim 12, wherein a screw connection with the sleeves can be secured against loosening by means of expansion screws and/or Nord-Lock rings.

14. The scraper system according to claim 6, wherein hard metal or stainless steel can be selected as the material for the protective cap.

15. The scraper system according to claim 1, wherein the support axis of rotation is mounted on both sides of the belt conveyor in each case in a bracket, and the brackets are rigidly connected to the belt structure.

16. A combination of two scraper systems, said combination comprising a scraper system according to claim 1, as a primary scraper and another belt scraper as a secondary scraper, wherein the secondary scraper is composed of scraper modules which comprise a blade support comprising a scraper blade that forms an obtuse angle relative to the belt in the direction of travel, and a scraper head axis of rotation that can be freely oriented.

17. A method for cleaning fast-moving belt conveyors by a combination of two scraper systems according to claim 16, wherein a primary scraper makes contact in the region of the tripper pulley and a secondary scraper makes contact in the region of the lower run downstream of the tripper pulley, the primary scraper exerting a non-paring effect on residual conveyed material, and the secondary scraper exerting a paring effect on the residual conveyed material.

18. The scraper system according to claim 1, wherein the adjusting spring is a spiral spring, and the damper spring is an elastomer spring.

19. The scraper system according to claim 1, wherein the spring device comprises:
the spring bolt being connected by a first end thereof to the support mounting and having an adjustment option for a second stop at a second end thereof,
the second stop being suitable for receiving an end of the adjusting spring.

* * * * *